US007256909B2

(12) United States Patent
Gomi

(10) Patent No.: US 7,256,909 B2
(45) Date of Patent: Aug. 14, 2007

(54) PROXY PRINT PROCESSING APPARATUS, PROXY PRINT PROCESSING METHOD, PROGRAM, AND MEMORY MEDIUM

(75) Inventor: Tomohiro Gomi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1007 days.

(21) Appl. No.: 10/384,319

(22) Filed: Mar. 7, 2003

(65) Prior Publication Data

US 2003/0174359 A1    Sep. 18, 2003

(30) Foreign Application Priority Data

Mar. 12, 2002    (JP)    ............................. 2002-067001

(51) Int. Cl.
*G06F 15/00* (2006.01)
*G06F 3/12* (2006.01)
(52) U.S. Cl. .................................... 358/1.18; 358/1.15
(58) Field of Classification Search ................ 358/1.1, 358/1.8, 1.13, 1.15, 1.18, 448, 402
See application file for complete search history.

(56) References Cited

U.S. PATENT DOCUMENTS

| 6,895,553 B2* | 5/2005 | Wiley et al. ................ 715/526 |
| 2003/0030843 A1* | 2/2003 | Qiao .......................... 358/1.15 |
| 2003/0169446 A1* | 9/2003 | Grohs et al. ............... 358/1.15 |

FOREIGN PATENT DOCUMENTS

| JP | 2001-290630 | 10/2001 |
| JP | 2003-296086 | 10/2003 |
| JP | 2003-312144 | 11/2003 |

* cited by examiner

*Primary Examiner*—Gabriel I. Garcia
(74) *Attorney, Agent, or Firm*—Cowan, Liebowitz & Latman, P.C.

(57) ABSTRACT

To enable automatic proxy printing and manual proxy printing to be switched and used, whether the automatic proxy printing has been set or not is discriminated. If it is determined that the automatic proxy printing has been set, the automatic proxy printing is executed. If it is determined that the automatic proxy printing is not set, the manual proxy printing is executed.

8 Claims, 17 Drawing Sheets

EXAMPLE OF DISPLAY SCREEN

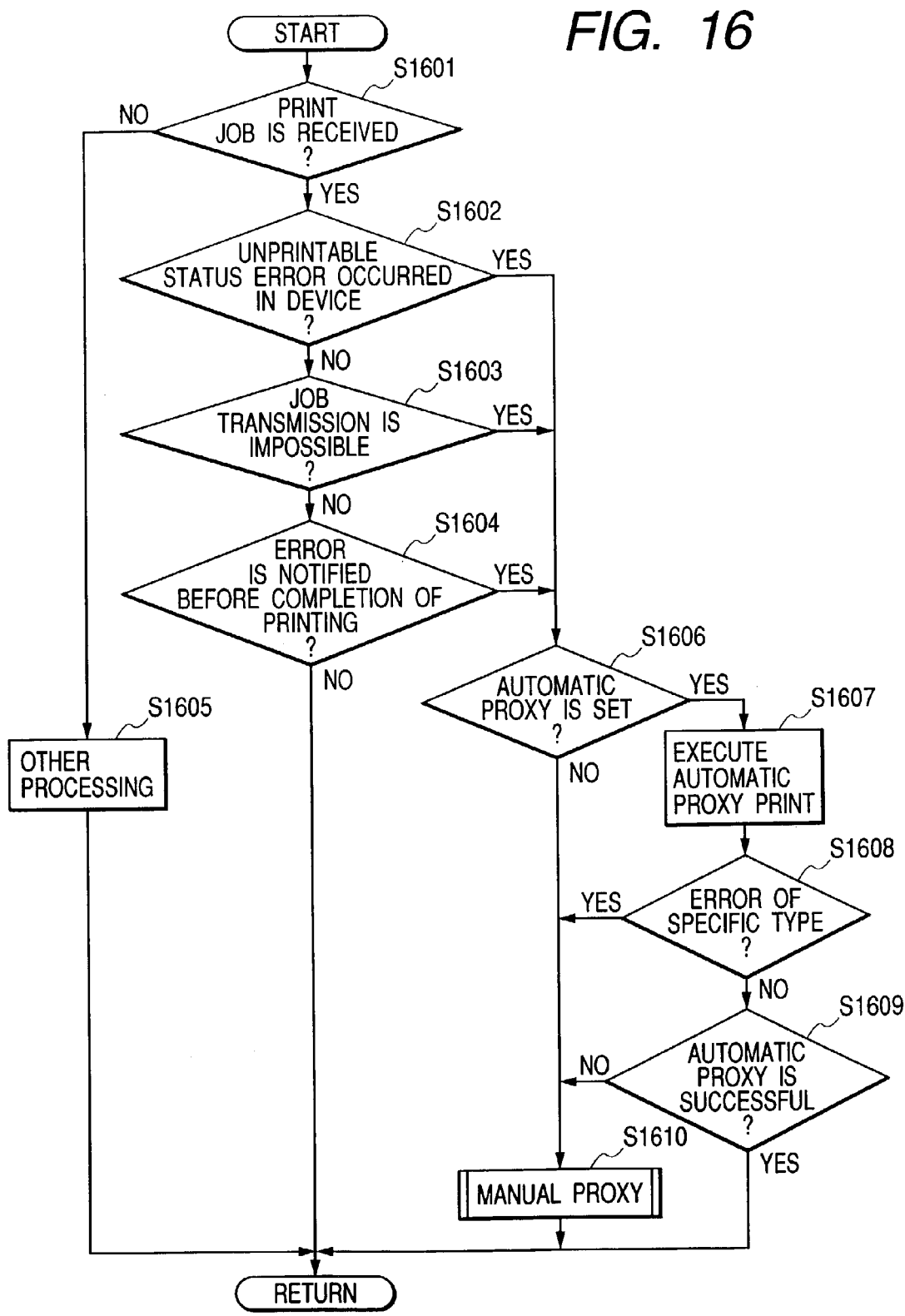

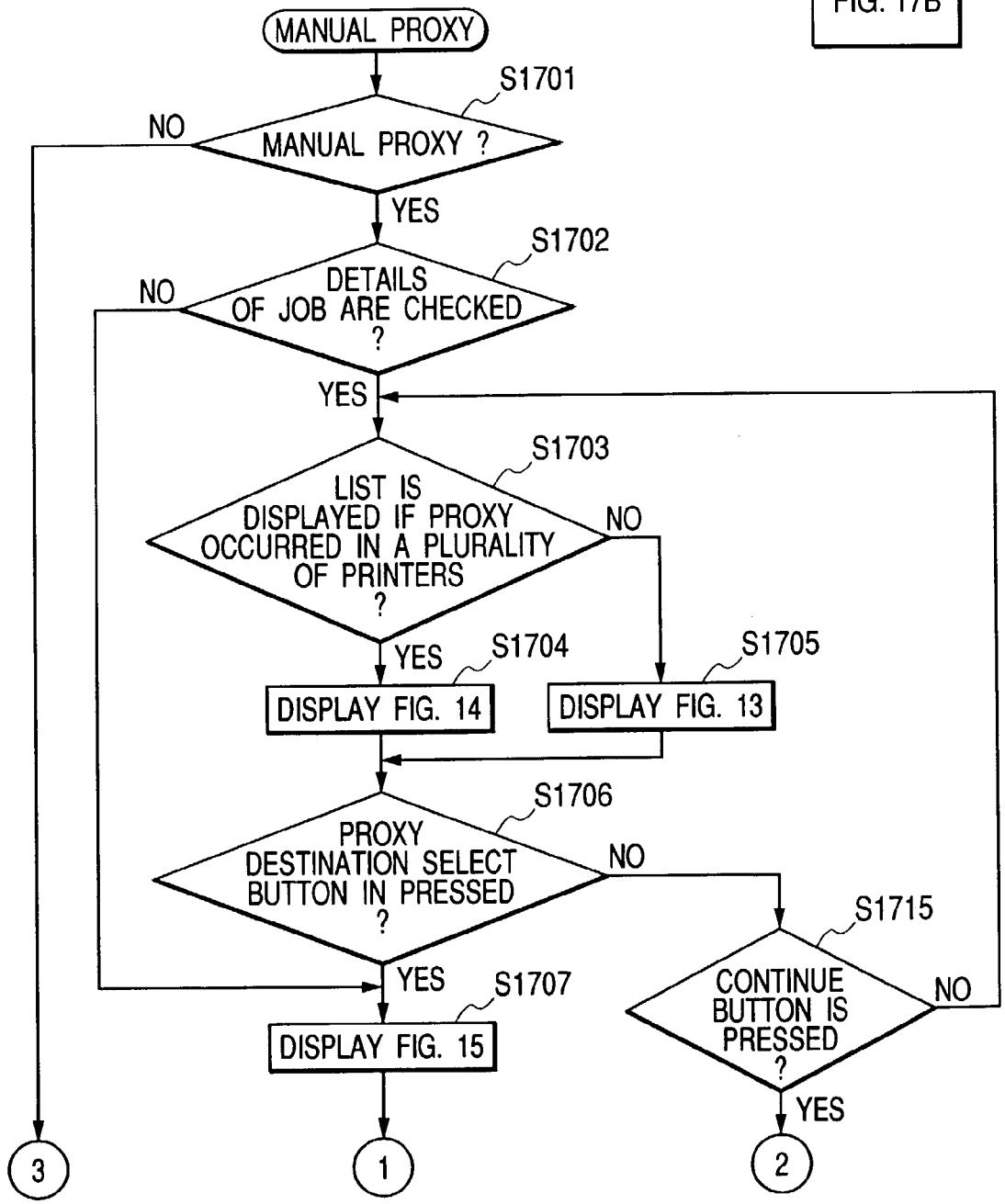

PROXY PRINT PROCESSING APPARATUS, PROXY PRINT PROCESSING METHOD, PROGRAM, AND MEMORY MEDIUM

BACKGROUND OF THE INVENTION

1. Field of the Invention

The invention relates to proxy print processing apparatus, method, program, and memory medium for executing a proxy printing process.

2. Related Background Art

Hitherto, in a printer connected to a network, when an error occurs in the printer upon printing, proxy printing is requested to another printer and the proxy printing is executed by another printer.

However, in the above conventional printer, automatic proxy and manual proxy cannot be switched and used either.

At the time of the automatic proxy, it cannot be switched to the manual proxy.

A proxy method cannot be switched in accordance with a type of data or job.

SUMMARY OF THE INVENTION

To solve the above problems, according to the invention, there is provided a proxy print processing apparatus comprising:

discriminating means for discriminating whether automatic proxy printing has been set or not; and processing means for, if it is determined by the discriminating means that the automatic proxy printing has been set, allowing the automatic proxy printing to be executed, and if it is determined by the discriminating means that the automatic proxy printing is not set, allowing manual proxy printing to be executed.

According to the invention, there is provided a proxy print processing apparatus comprising:

discriminating means for discriminating whether printing could be executed at the time of automatic proxy printing or not; and means for, if it is determined by the discriminating means that the printing cannot be executed at the time of the automatic proxy printing, allowing manual proxy printing to be executed.

According to the invention, there is provided a proxy print processing apparatus comprising:

discriminating means for discriminating whether a designated error has occurred when automatic proxy printing is executed or not; and means for, if it is determined by the discriminating means that the designated error has occurred, suppressing the automatic proxy printing.

According to the invention, there is provided a proxy print processing apparatus comprising:

means for, when proxy printing is executed, displaying a display screen for designating the number of copies or a display screen for designating a page in accordance with a type of job;

means for allowing the proxy printing of the copies of the number designated on the display screen for designating the number of copies to be executed; and means for allowing the proxy printing of the page designated on the display screen for designating the page to be executed.

According to the invention, there is provided a proxy print processing apparatus comprising:

discriminating means for discriminating a type of data when proxy printing is executed; and processing means for allowing partial proxy printing or whole proxy printing to be executed in accordance with a result of the discrimination of the discriminating means.

BRIEF DESCRIPTION OF THE DRAWINGS

FIG. 16 is a flowchart showing an algorithm for proxy printing; and

DETAILED DESCRIPTION OF THE PREFERRED EMBODIMENT

An embodiment which is preferable to apply the invention will be explained hereinbelow.

Figure 1:
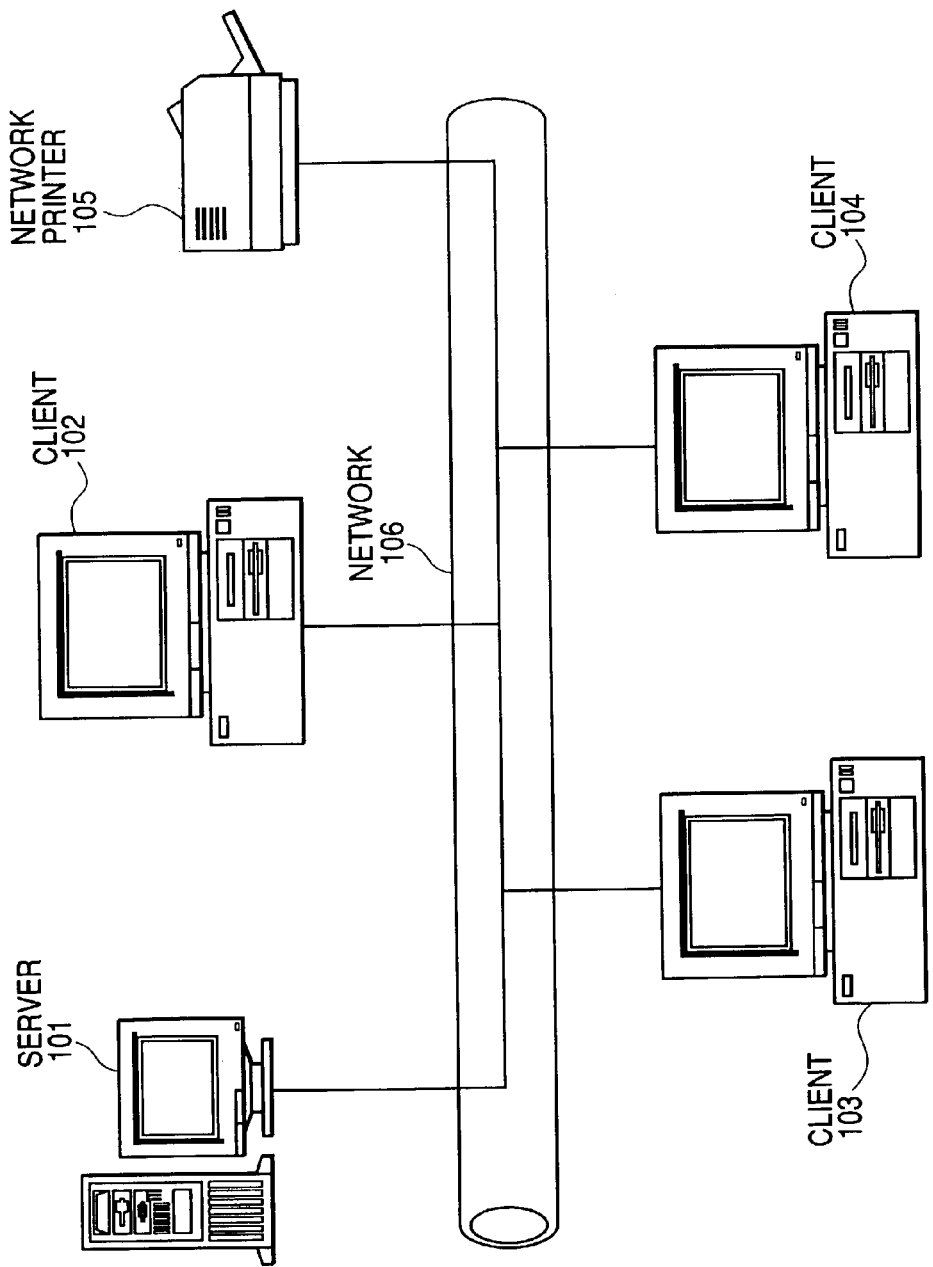
FIG. 1 is a block diagram for explaining modules and an input/output apparatus constructing a distributed and proxy printing system according to an embodiment.

FIG. 1 is a block diagram for explaining a construction of an information processing system to which the invention can be applied. It is assumed that one or a plurality of client computers in the present system is/are connected.

In FIG. 1, reference numerals 102, 103, and 104 denote information processing apparatuses serving as client computers (clients) which are connected to a network 106 by a network cable such as Ethernet (registered trademark) or the like and can execute various programs such as an application program and the like. Each of those client computers has a printer driver having a function for converting print data into a printer language corresponding to a printer. It is assumed that the printer driver supports a plurality of printer drivers.

Naturally, as a printer, it is also presumed that the invention can be applied to various types of printing apparatuses such as laser beam printer using an electrophotographic system, ink jet printer using an ink jet system, printer using a thermal transfer system, and the like.

Reference numeral 101 denotes an information processing apparatus serving as a server in the embodiment (hereinafter, referred to as a print server) which is connected to the network 106 by the network cable, accumulates files which are used in the network, and monitors a use state of the network 106. The print server 101 manages a plurality of printers connected to the network 106.

As a construction, the clients 102 to 104 and the print server 101 are general information processing apparatuses. Print control programs for making different control have been stored in the clients and the print server so that they can be executed, respectively.

The print server 101 is a general information processing apparatus and can also have functions of the clients 102 to 104.

The print server 101 in the embodiment further has the following functions such that: print jobs including print data whose print requests have been made from the client computers 102, 103, and 104 are stored and the print data is printed; only job information which does not include the print data is received from the client computers 102, 103, and 104 and printing order of the client computers 102, 103, and 104 is managed; the client whose printing order has come is notified of permission of transmission of the print job including the print data; and various information such as status and print job of a network printer 105 is obtained and notified at the client computers 102, 103, and 104.

Reference numeral 105 denotes the network printer serving as a print control apparatus which is connected to the network 106 via a network interface (not shown), analyzes the print job including the print data which is transmitted from the client computers, converts it into a dot image one page by one, and prints it every page. Reference numeral 106 denotes the network which is connected to the client computers 102, 103, and 104, server 101, network printer 105, and the like.

Figure 2:
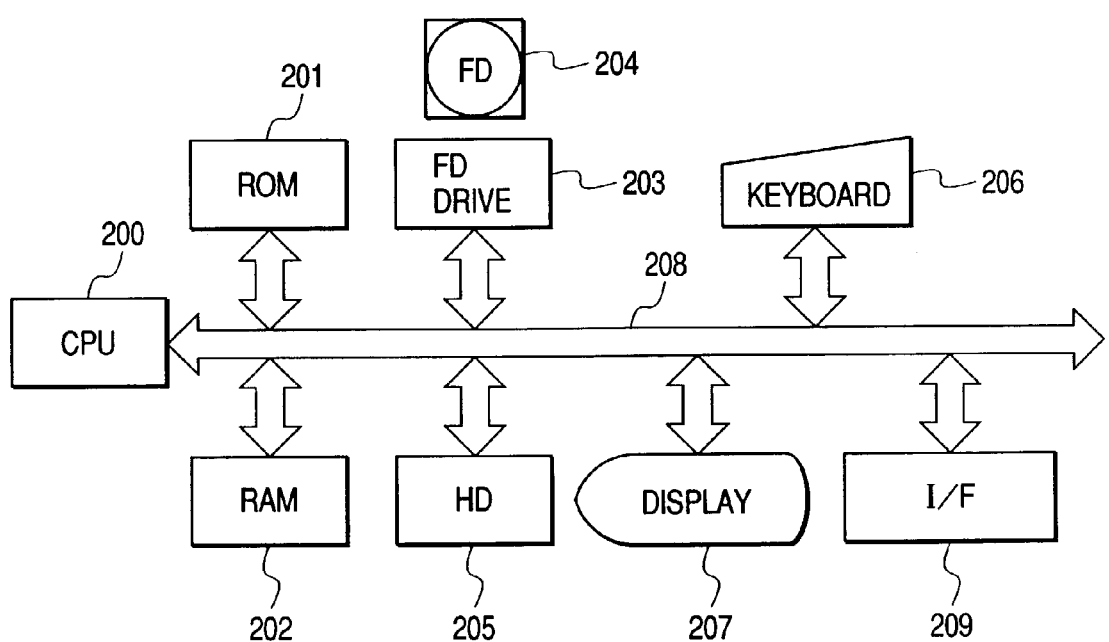
FIG. 2 is a block diagram for explaining a construction of an information processing apparatus in the embodiment.

FIG. 2 is a block diagram for explaining a construction of the information processing apparatus in the embodiment. It is assumed that each of the client computers 102, 103, and 104 serving as information processing apparatuses also has a similar construction and, further, the server 101 also has a similar hardware construction. Therefore, FIG. 2 will now be explained as a block diagram for explaining a construction of the clients and server.

In FIG. 2, reference numeral 200 denotes a CPU serving as control means of the information processing apparatus. The CPU 200 executes an application program, a printer driver program, an OS, a network printer control program of the invention, and the like which have been stored in a hard disk (HD) 205 and makes control for temporarily storing information, files, and the like which are necessary for executing the programs into a RAM 202.

Reference numeral 201 denotes a ROM serving as memory means. Programs such as a basic I/O program and the like and various data such as font data, template data, and the like which are used in document processes are stored in the ROM 201. Reference numeral 202 denotes the RAM serving as temporary memory means. The RAM 202 functions as a main memory, a work area, or the like of the CPU 200.

Figure 5:
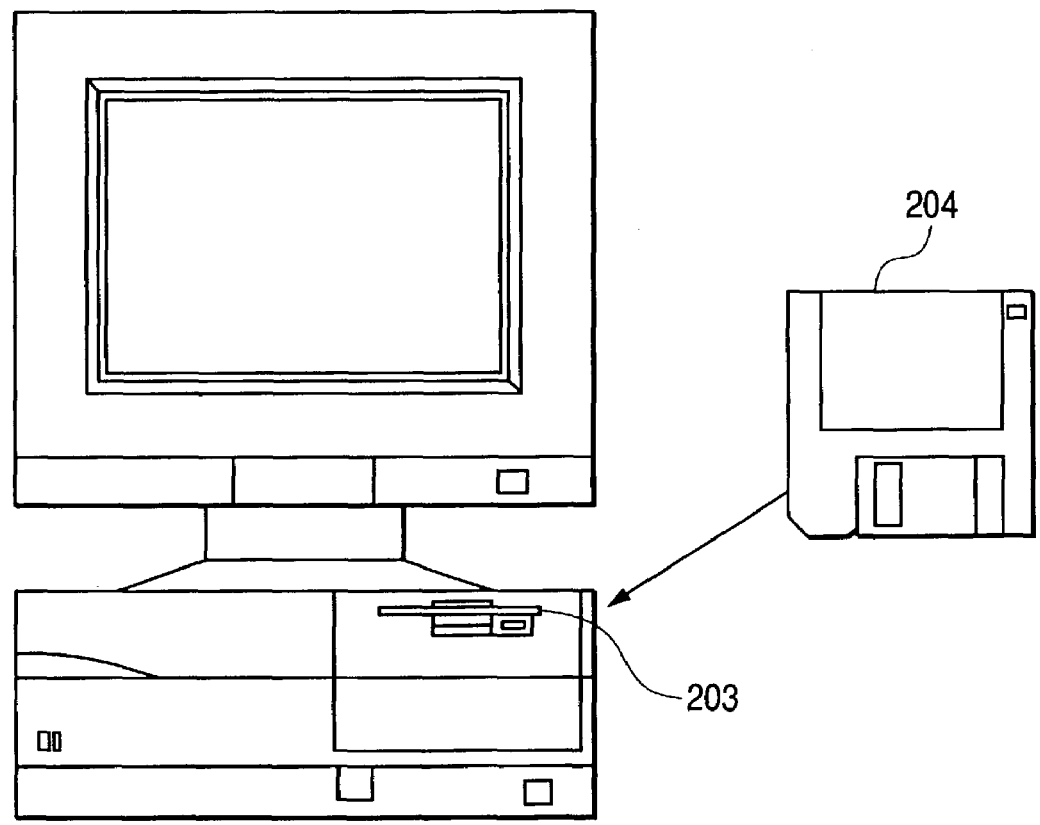
FIG. 5 is a diagram showing a relation with an FD which is inserted into an FD drive shown in FIG. 2.

Reference numeral 203 denotes a floppy (registered trademark) disk (FD) drive serving as memory medium reading means. A program or the like stored in an FD 204 as a memory medium can be loaded into the computer system via the FD drive 203 as shown in FIG. 5, which will be explained hereinbelow. The memory medium is not limited to the FD but a CD-ROM, a CD-R, a CD-RW, a PC card, a DVD, an IC memory card, an MO, a memory stick, or the like can be arbitrarily used. Reference numeral 204 denotes the floppy disk (FD) as a memory medium and is a memory medium in which programs which can be read out by a computer have been stored.

Reference numeral 205 denotes one of external memory means and is the hard disk (HD) which functions as a memory of a large capacity. The application program, printer driver program, OS, network printer control program, their related programs, and the like have been stored in the HD 205. Further, a spooler serving as spool mans is held here. The spool means is a client spooler in the client and a server spooler in the print server. In the print server, job information received from the clients is stored and a table for controlling order is also formed and stored into this external memory means.

Reference numeral 206 denotes a keyboard serving as instruction input means. The user inputs and instructs a command such as a control command of the device or the like to the client computer or the operator or the administrator inputs and instructs such a command to the print server via the keyboard 206.

Reference numeral 207 denotes a display as display means for displaying the command inputted from the keyboard 206, a status of the printer, or the like.

Reference numeral 208 denotes a system bus for controlling a flow of data in the computer serving as a client or a print server.

Reference numeral 209 denotes an interface serving as input/output means. The information processing apparatus transmits and receives data to/from an external apparatus via the interface 209.

Figure 3:
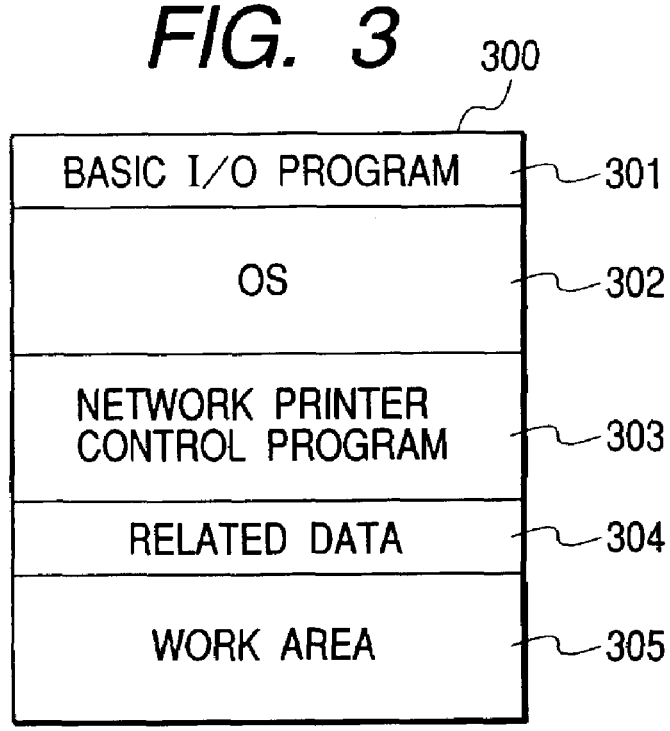
FIG. 3 is a diagram showing a memory map in the block diagram shown in FIG. 2.

FIG. 3 is a diagram showing an example of a memory map in the RAM 202 shown in FIG. 2. It shows the memory map in a state where the network printer control program which is loaded from the FD 204 has been loaded into the RAM 202 and can be executed. In the embodiment, an example in which the network printer control program and its related data are directly loaded into the RAM 202 from the FD 204 and executed is shown. However, as another method, it is also possible to construct the system in a manner such that each time the network printer control program is made operative from the FD 204, the network printer control program is loaded into the RAM 202 from the HD 205 in which the network printer control program has already been installed.

As a medium for storing the network printer control program, it is possible to use a CD-ROM, a CD-R, a PC card, a DVD, or an IC memory card other than the FD. Further, it is also possible to construct the system in a manner such that the network printer control program is preliminarily stored into the ROM 201, it is constructed so as to function as a part of the memory map, and it is directly executed by the CPU 200.

Software for realizing functions similar to those of the foregoing apparatuses can be also substituted for such hardware apparatuses.

The network printer control program is also simply referred to as a print control program. The print control program includes a program for making control to instruct a change of a print destination of the print job or instruct a change of print order on the client side. The print control program also includes a program for controlling the order of the print jobs or notifying the print server of the end of printing of the print job, a print destination changing request, or the like on the print server side. In the print control program of the invention for making such control, modules which are installed to the client and modules which are installed to the print server can be separately provided, or one print control program can function as a program for the client or a program for the print server in accordance with an environment where it is executed. In another case, it is also possible to construct the system in a manner such that both of the modules having the functions for the client and the modules which function as a program for the print server are installed into one computer and they are simultaneously made operative or time-divisionally falsely made operative in parallel.

Reference numeral 301 denotes a basic I/O program. When a power source of the control apparatus is turned on, the OS is read out from the HD 205 and stored into the RAM 202. The basic I/O program 301 is an area where a program having an IPL (Initial Program Loading) function or the like for starting the operation of the OS has been stored.

Reference numeral 302 denotes an operating system (OS); 303 a network printer control program which is stored in an area held in the RAM 202; 304 related data which is stored in an area held in the RAM 202; and 305 a work area in which an area where the CPU 200 executes the network printer control program is held.

Figure 4:
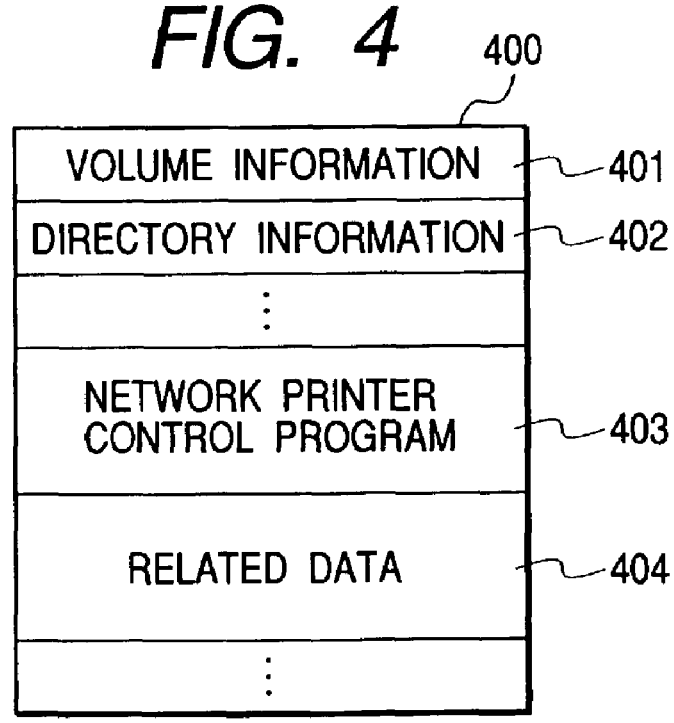
FIG. 4 is a diagram showing an example of the memory map in FIG. 3.

FIG. 4 is a diagram showing an example of the memory map in the FD 204 shown in FIG. 2. In FIG. 4, reference numeral 400 denotes data contents of the FD 204; 401 volume information showing information of the data; 402 directory information; 403 a network printer control program, which will be explained in the embodiment; and 404 its related data. The network printer control program 403 is obtained by being programmed on the basis of flowcharts, which will be explained in the embodiment. In the embodiment, both of the network printer control program for the clients and that for the server have a similar construction.

FIG. 5 is a diagram showing a relation with the FD 204 which is inserted into the FD drive 203 shown in FIG. 2. In the diagram, the same component elements as those in FIG. 2 are designated by the same reference numerals.

In FIG. 5, the network printer control program and its related data, which will be explained in the embodiment, have been stored in the FD 204.

A print job control system for executing a proxy printing process by using a plurality of printers in the embodiment will now be described.

When the print job is received from a Windows spooler or via an API, the print system executes a pre-process, thereafter, holds the job therein once, and newly adds it to targets for scheduling. If another job having a high priority to be printed before such a job exists, the print system transmits the job having the high priority first and subsequently transmits the job having a low priority. The print system continuously traces one job even after it was transmitted to a device until the completion of printing of the job (however, there are limitations, which will be explained hereinlater). If the printing of the job is successfully finished, the print system notifies the user who issued the print job of the print end. A notifying method differs in dependence on a printing method or setting as will be explained hereinlater.

If an error occurred during the process of the print job and the printing cannot be completed, the print system executes the following processes in accordance with a situation. Details will be explained hereinlater.

Automatic Proxy Printing:

In the case where an error indicative of an unprintable status occurred in the device in a state where the print job is in a transmission waiting state in the print system, the case where the transmission becomes impossible during the transmission of the print job, or the case where after the print job was transmitted to the device, the occurrence of the error is detected on the device side before a print end notification comes, first, the print system tries to change the print destination to another device which the user has previously designated for proxy printing.

Manual Proxy Printing:

When the error/problem as mentioned above occurs, if the automatic proxy printing is not set or if the printing cannot be executed even in the automatic proxy printing mode, the print system notifies the user of such a fact, thereby making the user to select one of a mode in which other devices are distinctly designated and the print destination is changed (manual proxy printing), a mode in which the system is made to wait for the original device to print, and a mode in which the job is cancelled. The print system executes the process selected by the user.

An outline of the proxy printing function will now be described.

When the print system intends to output and instruct the print job to the designated printer, if the printer cannot be used, if the system enters a situation such that the printing cannot be executed by the printer designated as a print destination like a case where an error occurred in the device during the printing, or if proxy conditions designated by the user occur in the job, the print system can change the print destination of this job to another printer.

There are the following two types in the proxy printing.

(1) Automatic Proxy Printing

The print system changes the print destination to another printer which the user has previously designated. In this case, in case of occurrence of a fault, the proxy is executed without waiting for a distinct instruction of the user.

(2) Manual Proxy Printing

The user distinctly designates the print destination.

In the case where the job in which the proxy conditions occurred is issued from the application by using a virtual printer and the printing method of the job has been set to the automatic proxy, the automatic proxy is executed on the basis of the setting. Even if the job in which the proxy conditions occurred is issued by using the virtual printer, in the case where the printing method of the job has been set to a method other than the automatic proxy or the case where the printing cannot be completed even by the automatic proxy function, the print system gives the user an opportunity for executing the manual proxy by the UI. Even in the case where the job in which the proxy conditions occurred is issued from the application by using the printer to which a PDL driver has been allocated, the automatic proxy is not performed but the print system gives the user an opportunity for executing the manual proxy by the UI (as a method other than the selection of the manual proxy, a method whereby the designated original printer is held or a method whereby the printing process is cancelled is also prepared as selection items).

Irrespective of a difference between the automatic proxy and the manual proxy, when the proxy printing is executed, if job data remains in the device which first intended to print and this device supports a function for allowing another machine on the network to operate an internal job, the print system deletes the residual job data.

The setting of the automatic proxy printing will now be described.

To execute the automatic proxy printing, one or a plurality of printers (output destination printers) using the PDL driver is/are registered to one printer to which a group printer driver has been allocated.

The output destination printers have to be prioritized, respectively. The overlap of the priorities is not permitted.

The output destination printers have to exist on the same machine as that of the automatic proxy printer. The printer formed by a shared printer function cannot be registered as an output destination printer of the automatic proxy printer on the machine.

The proxy printing occurrence conditions and the shift to the proxy printing process will now be described.

Every printer having an output port has the setting of the proxy printing occurrence conditions irrespective of whether the group printer driver has been allocated or the PDL driver has been allocated. When the print job is issued from the application, the setting which the printer to be used has becomes the proxy printing occurrence conditions of this job. If this job is an original job, those conditions are also inherited to its output port. If the proxy printing is executed, those conditions are also inherited to the job after completion of the proxy.

If the following conditions are satisfied, when this job is the original job and the outputting method has been set to the automatic proxy, the operating mode is shifted to the automatic proxy. In other cases, a dialog is displayed and an opportunity for executing the manual proxy is given to the user. In such a case, the user can individually select the conditions among them under which the proxy printing is actually executed.

(When the Error Occurs)

The case where it is detected that an error indicative of an unprintable status occurred in the device which is going to print when the print job is in a transmission waiting state in the print system.

The case where the transmission becomes impossible during the transmission of the job data to the device for some reason (for example, a power source of the device is turned off) and an error of communication with the device is detected. The case where it is detected that the error indicative of the unprintable status occurred in the device during the transmission of the job data to the device.

The case where after the print job data was transmitted to the device, the error indicative of the unprintable status occurred in the device before the print end notification comes.

(When a Warning is Generated in the Device)

The case where it is detected that a warning occurred in the device which is going to print when the print job is in the transmission waiting state in the print system.

The case where it is detected that the warning occurred in the device during the transmission of the job data to the device.

The case where after the print job data was transmitted to the device, the warning occurred in the device before the print end notification comes.

(When a Print Load on the Device is High)

The case where even when the device is normally processing the print job, if a print load on the device is high, the proxy printing is executed. That is, the case where with respect to the printer which is going to print, the job whose print load is equal to or higher than a preset threshold value is in a print waiting state. As a threshold value, one or both of the number of jobs in the print waiting state and the sum of sizes of jobs in the print waiting state can be designated. A range where the jobs in the print waiting state are checked is set to a range in the output port associated with the target printer.

(At the Time of Pause or Error of the Output Port)

The case where the output port is in a temporary stop state or an error state.

An example of suppression of the proxy printing according to a job type will be subsequently explained.

The proxy printing is not executed with respect to the following types of jobs.

Form register job
Secure job
BOX job
FAX job

Automatic proxy suppressing conditions upon setting of the automatic proxy printing will be subsequently explained.

Even in the case where the automatic proxy has been set, a mode such that the automatic proxy is not executed depending on a type of device error which occurred can be set. Such setting is made also in consideration of a case where the user selects a method whereby he supplements paper instead of allowing another device to execute the proxy printing if there is no paper. The user preliminarily select a type of error in which the automatic proxy is suppressed. The following types of errors can be selected.

No paper
Paper jam
Door/cover is open
Paper ejection tray is full

They can be Independently Selected.

In the embodiment, a driver such that the print setting can be unitarily instructed to each printer driver corresponding to each of a plurality of printer devices and a despooler (which will be explained in detail hereinlater) forms basic data (general document data) for forming a general print file for notifying each printer driver of a draw command is referred to as a group printer driver. Each printer driver depending on the printer device is referred to as a member printer driver.

Figure 6:
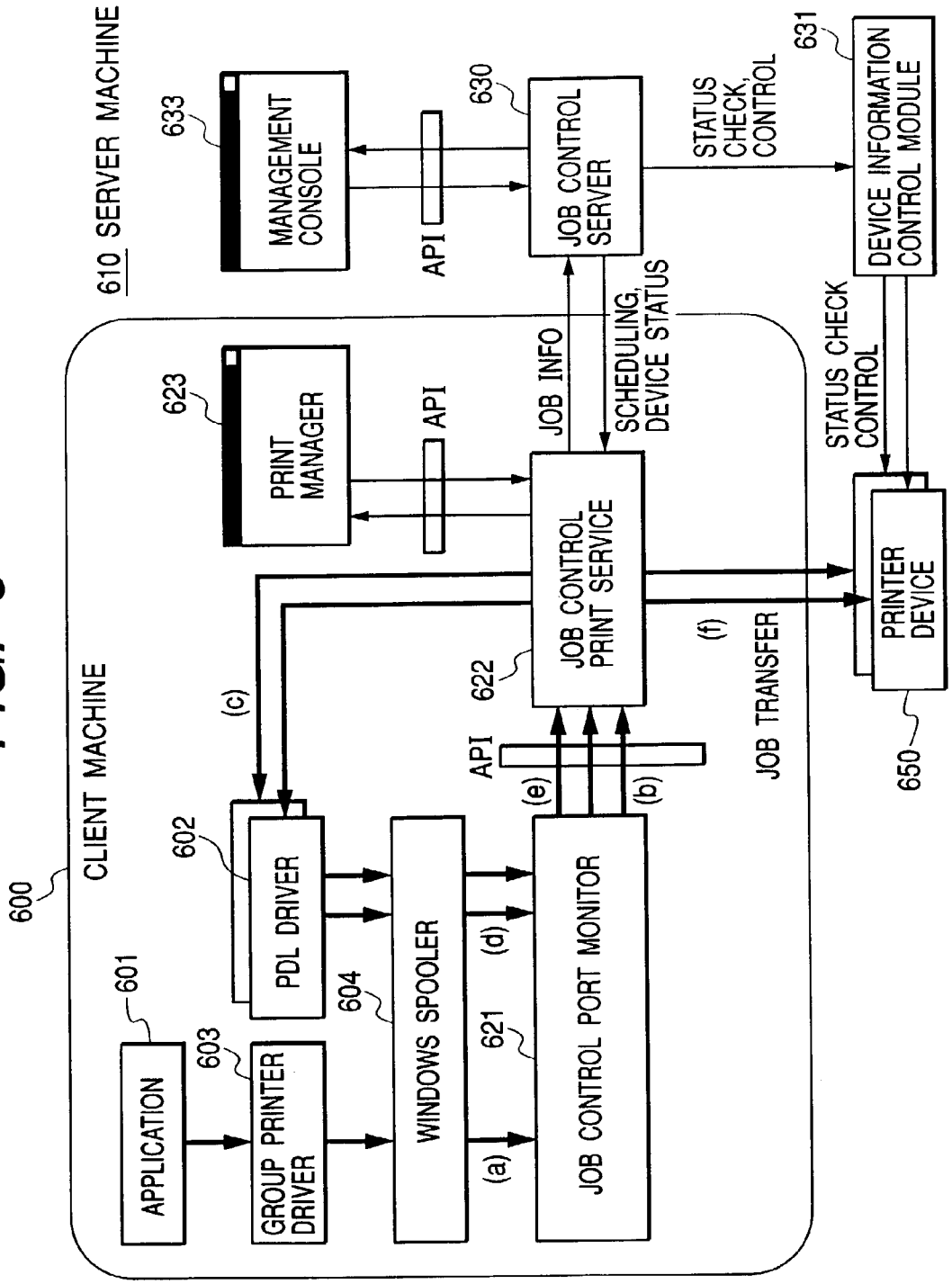
FIG. 6 is a diagram showing a flow for processes of a client server model of the present system.

FIG. 6 is a diagram showing a flow of processes in the print job control system along which a print job issued from a general application program such as word processor software or the like is processed in a client server model of the present system. In FIG. 6, reference numeral 600 denotes a client machine in which a client module of the print job control system operates.

Usually, when the printing is instructed, the application program allows a series of draw commands to be generated via a graphics function of the OS. The draw commands are transferred to a Windows spooler via the printer driver. The Windows spooler takes a procedure for sending print job data to a port monitor selected by the user and transmitting it to the printer device.

In the embodiment, the user previously designates a port monitor 621 for the print job control system (hereinafter, this monitor is abbreviated to a job control port monitor in the embodiment) and instructs the printing. An application program 601 forms the draw command via a series of OSs.

In a group printer driver 603 which received the draw command, general document data to form a general print file is generated and transmitted as print job data to the job control port monitor 621 instead of a port monitor which transmits the print job data to the printer device. The job control port monitor 621 does not transmit the print job data to printer devices 650 but to a print service 622 for the print job control system (hereinafter, this print service is abbreviated to a job control print service in the embodiment). The job control print service 622 has a function of managing statuses of the job/device which are managed by a job control server 630. Further, if the device and the client PC mutually operate under a peer-to-peer connection environment, the job control print service 622 also has a function of managing information such as device status, job status, and the like which are notified from the device or sending a predetermined command to the device. Such a function corresponds to a function of managing device information and job information of a plurality of printer devices 650.

A print manager 623 for the print job control system (hereinafter, this print manager is abbreviated to a job control print manager in the embodiment) is a program for providing a user interface (UI) for allowing the user to examine a status of the print job in the job control print service 622 or operate the print job.

The job control print manager 623 has a function of executing transmission and reception of the information to/from the job control print service 622 via an interface (API) of software of the job control print service 622 and obtaining mainly status information, as an event, of external printer devices which are managed by the job control print service 622. As types of notification of the event, there are presumed: a notification of error/warning information such as warning indicative of a shortage of residual toner amount, fault of communication between the client and the device, lack of memory capacity, full of paper ejection tray, or the like; a notification of normality information showing that the system is returned from the error status to the normal status; and the like.

A server 630 for the print job control system (hereinafter, this server is abbreviated to a job control server in the embodiment) concentratedly controls (scheduling) timing when the job control print service 622 on each client 600 transmits the print job data to the printer devices 650. The job control server 630 has a function of monitoring a status such as under print execution, power control status, fault information (paper jam), or the like of each device (printing apparatus) which can be communicated via the network and notifying the job control print service 622 of the event. With respect to the monitoring of the status change of the printer status, the job control print service 622 can directly obtain the notification (event) of the status change from the printer device.

A management console 633 for the print job control system (hereinafter, this management console is abbreviated to a job control management console in the embodiment) transmits and receives information and instructions to/from the job control server 630 via the API for allowing software which the job control server 630 has to access, so that it can monitor the whole print job control system.

The job control server 630 communicates with each printer device 650 by using a device information control module 631, obtains information regarding the print job and operating status in each printer, and executes operations. The obtained information can be transferred to the job control print service 622 on the client 600 side.

The printing from the group printer driver 603 in the embodiment will now be described.

The group printer driver 603 generates the general document data described above on the basis of the series of draw commands formed by the application program. The general document data is converted into a general print file as a file in an intermediate format which does not depend on the type of printer device by the job control print service 622. A construction of the general print file will be explained hereinlater.

As mentioned above, the general print file is transferred from a Windows spooler 604 to the job control print service 622 (b) via the job control port monitor 621 (a). In accordance with the type of job control which is made to this print job, the job control print service 622 generates the draw command on the basis of the general print file (c). Subsequently, a PDL driver 602 converts the draw command into a PDL file which can be interpreted by the printer device 650. FIG. 6 shows an example in which job control for dividing the print job into two jobs is made to the print job by the job control print service 622. An example in which two member jobs are formed is shown by two arrows (c). The PDL file formed by the PDL driver 602 is again transferred to the job control print service 622 (e) via the Windows spooler 604 and the job control port monitor 621 (d). The job control print service 622 transmits the print job data of the PDL to the printer device 650 in accordance with an instruction of the job control server 630 (f).

In accordance with instructions of a print instruction manual in the general print file, the job control print service 622 logically divides one general print file into a plurality of print jobs, respectively transmits them to the different printer devices, and transmits again the once-transmitted print job data to another printer device. In the diagram, (c), (d), (e), and (f) show a path of the print job data in such a case.

In the case where the application software forms the general print file and the application software directly inputs the general print file as a print job, a method of transferring the information to the group printer driver 603 and contents of processes in the group printer driver 603 are different from those of a general application. As mentioned above, in the case of the general application, when draw information is transferred to the group printer driver 603, the application calls a GDI function of Windows in a manner similar to the ordinary printer driver, the group printer driver 603 forms the general document data in accordance with it, and the formed general document data is formed in the general print file by the job control print service 622. On the other hand, in the case of the application for directly forming the general print file, the application already has the general print file and supplies it to the group printer driver 603. On the basis of a preset printing method, the group printer driver 603 rewrites the print instruction manual in the general print file as necessary and sends it to the Windows spooler 604.

Figure 8:
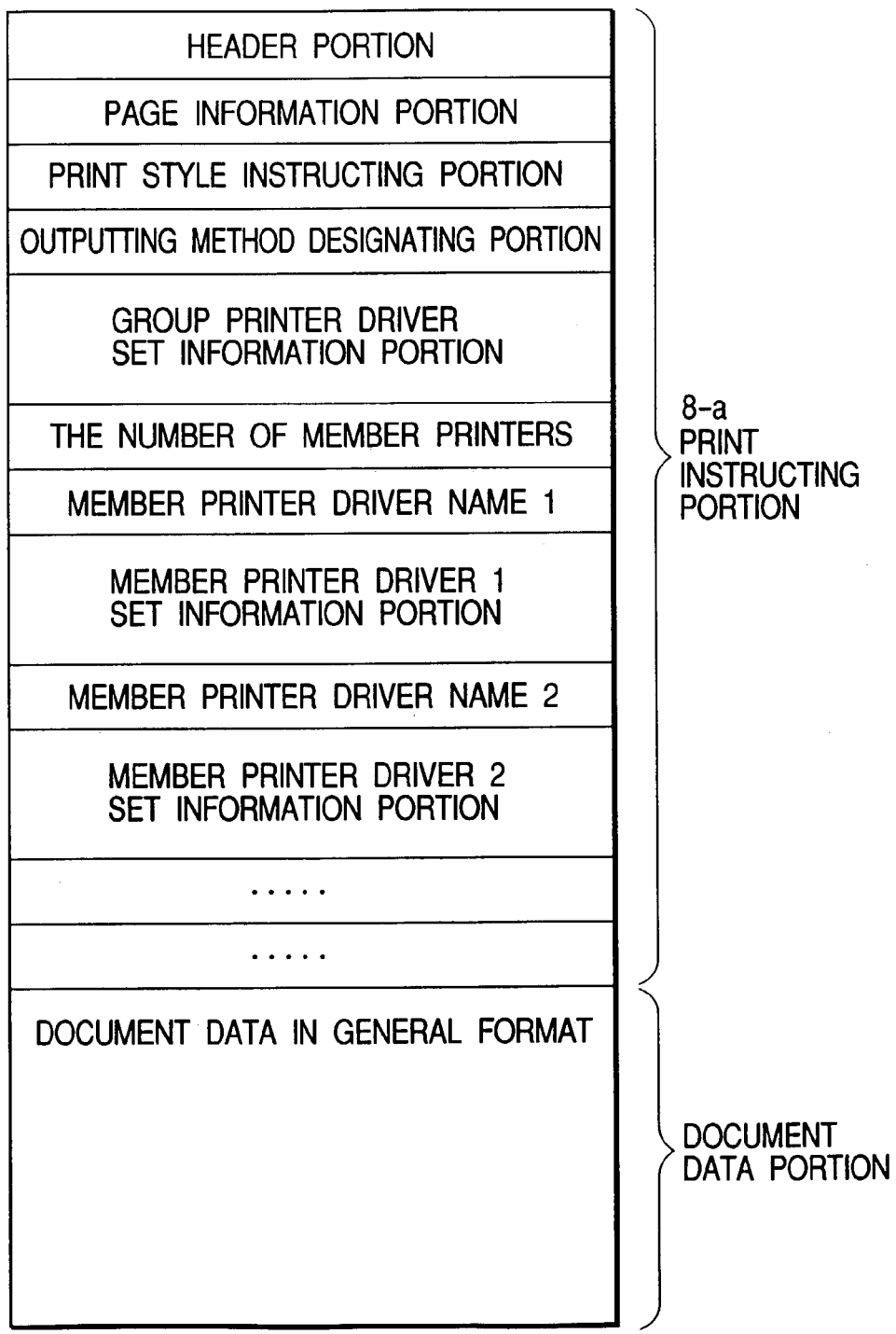
FIG. 8 is a diagram showing an example of a construction of a general print file of the present system.

FIG. 8 is a diagram showing an example of a construction of the general print file.

The general print file which is used in the embodiment comprises a print instructing portion 8-*a* and a document data portion 8-*b*. The print instructing portion is a portion in which the information of the document and the print instruction have been described. The document data is obtained by converting the data of the application into the data in a general format and has a data format which is independent of a printer language.

The print instructing portion comprises: a header portion; a page information portion; a print style instructing portion; an outputting method designating portion; a group printer driver set information portion; the number of member printers; a member printer driver name; a member printer driver set information portion; and the like.

The header portion is a portion to store information such as version identification, file information, and the like of the file. The page information portion is a portion to store the information of the number of pages of the document data in the document data portion 8-*b*, a size of each page, and the like.

The print style instructing portion is a portion to store information regarding an output style such as print page range, the number of prints, face information (N-up, booklet print, or the like) of the document data, staple instruction, punch instruction, and the like.

The outputting method designating portion is a portion to store information such as distributed printing, color/monochromatic distributed printing, proxy printing, multi-address printing, or the like as an outputting method.

The group printer driver set information portion is a portion to store set information of a UI of a group printer driver, which will be explained hereinlater.

The number of member printers is a portion to store the number of member printers with which the group printer driver is associated.

The member printer driver name is a portion to store the printer driver name of the member printer.

The member printer driver set information portion is a portion to store, for example, DEVMODE information as set information of a driver UI of the member printer.

Each of the member printer driver name and the member printer driver set information portion has storing areas of the number as many as the member printers stored in the number of member printers mentioned above.

In the group printer driver 603 described in FIG. 6 mentioned above, when the general print file is formed, the setting on a group printer driver GUI is recorded into the print instructing portion 8-*a*. Further, the group printer driver 603 records the data received by the GDI into the document data portion of the general print file, as document data converted into the general data.

Subsequently, a relation between a print system which is provided by Windows and the print job in a print job control system and an outline of processes will be further explained in detail with reference to FIG. 7.

Figure 7:
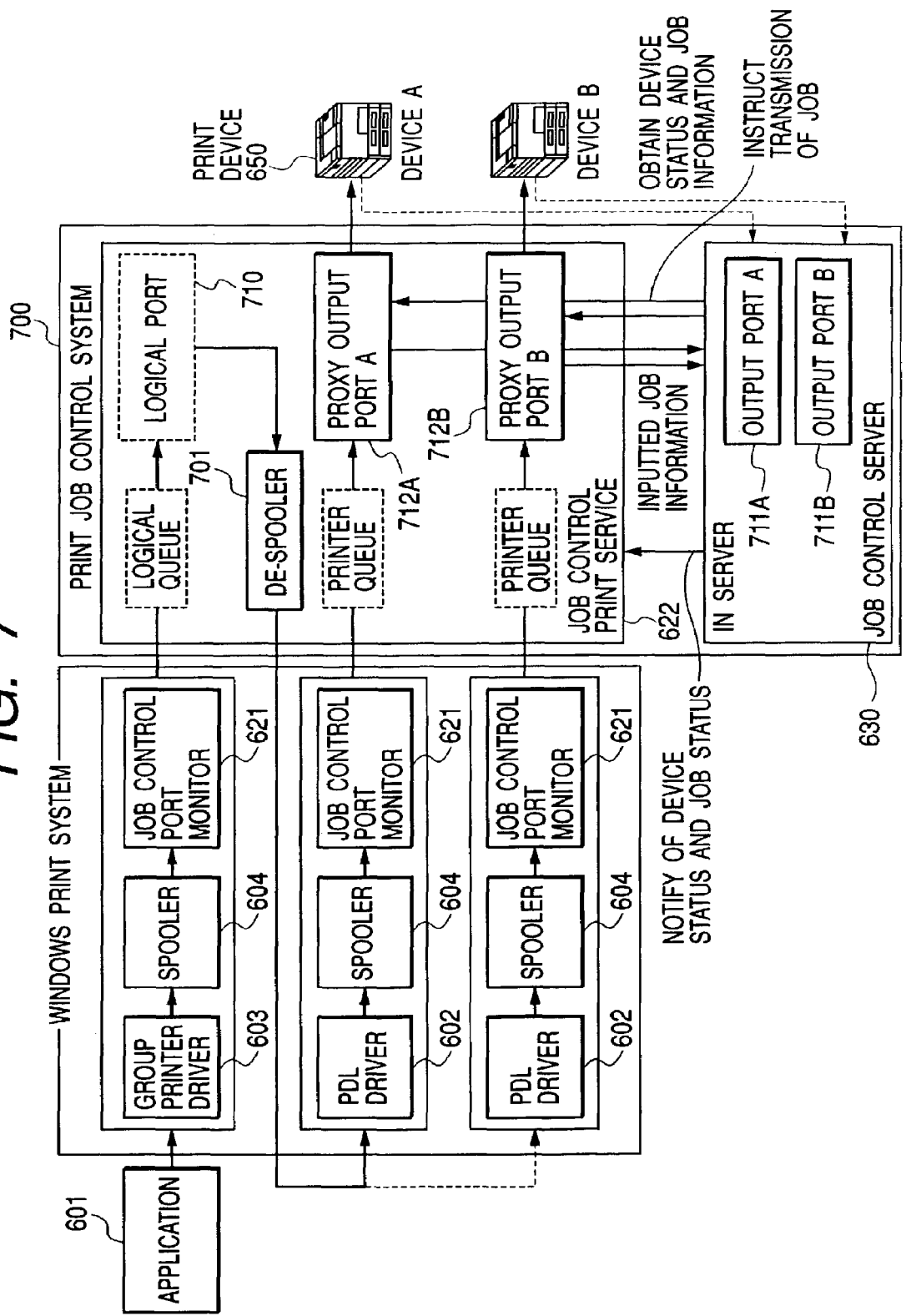
FIG. 7 is a diagram showing a print job control system of the client server model of the present system.

In FIG. 7, a print job control system 700 shows a range of the print job control system which strides over physical machines in which the control program for the server and the client operates. An output port 711 which is managed by the server is associated with a proxy output port 712 of the job control print service 622 of the client. All proxy output ports on each client associated with one port are unitarily managed. In the embodiment, the actual print job data is held in the proxy output port 712 of each client. The job control server 630 does not execute the transmitting process of the print job data itself but instructs the job control print service 622 only to transmit the print job. In accordance with the instruction, the job control print service 622 of the client transmits the print job data to the device 650.

Subsequently, processes in the case where the print job control system 700 executes additional valuable printing such as proxy printing, distributed printing, multi-address printing, or the like will be described.

When the print job control system 700 executes additional valuable printing such as proxy printing, distributed printing, multi-address printing, or the like, the user or the application 601 has to issue the print job to the printer to which the group printer driver 603 has been allocated. The job control print service 622 receives the job data processed by the group printer driver 603 as a general print file via the job control port monitor 621. The job control print service 622 receives this job, issues a job (member job) to another printer to which the PDL driver has been allocated via a despooler 701, and allows this printer to execute the printing.

At this time, the despooler 701 interprets the print instructing portion 8-*a* of the general print file described in FIG. 8 mentioned above, modifies the document data of the document data portion 8-*b*, converts it into a GDI of Windows, instructs each printer driver to print, and issues the print job. For example, if an instruction of 2-up has been recorded in the print style instructing portion, the document data of two pages is reduced and arranged onto one sheet of paper. In the case of the distributed printing or the multi-address printing, the despooler issues jobs to a plurality of member printers described in the print instructing portion 8-*a* in accordance with those set printing modes. In the case of the proxy printing, when the proxy conditions are satisfied, the member jobs are issued in accordance with the preset setting in the automatic proxy or in accordance with the operation of the user in the manual proxy. There is also presumed a form such that a module different from the despooler described above is made to allow instruction information corresponding to each member printer driver to be extracted from the print instructing portion 8-*a* and the despooler is made to interpret the extracted print instruction to each member printer driver.

When the job is issued to each member printer, as a print instruction corresponding to the member printer driver, the despooler 701 needs to form DEVMODE of each member printer. In this case, the DEVMODE is formed by properly reflecting the contents described in the print instructing portion 8-*a* to DEVMODE of each member printer.

The job control print service 622 on the client side receives the PDL data of each member job which has been rendered by the PDL driver 602 via the job control port monitor 621, notifies the server side of the information regarding the received job, and temporarily holds the job data into the own proxy output queue 712. After that, when a transmitting instruction is received from the job control server 630, the job control print service 622 transmits the job data to the printer device 650.

FIG. 8 is a diagram showing an example of a construction of the general print file described above.

The general print file which is used in the embodiment comprises the print instructing portion 8*a* and the document data portion 8-*b*. The print instructing portion is a portion in which the information of the document and the print instruction have been described. The document data is obtained by converting the data of the document of the application into the data in a general format. The document data has a data format which is independent of the printer language.

The print instructing portion comprises: the header portion; the page information portion; the print style instructing portion; the outputting method designating portion; the group printer driver set information portion; the number of member printers; the member printer driver name; the member printer driver set information portion; and the like.

The header portion is a portion to store the information such as version identification, file information, and the like of the file.

The page information portion is a portion to store the information of the number of pages of the document data in the document data portion 8-*b*, a size of each page, and the like.

The print style instructing portion is a portion to store information regarding an output style such as print page range, the number of prints, face information (N-up, booklet print, or the like) of the document data, staple instruction, punch instruction, and the like.

The outputting method designating portion is a portion to store the information such as distributed printing, color/monochromatic distributed printing, proxy printing, multi-address printing, or the like as an outputting method.

The group printer driver set information portion is a portion to store the set information of the UI of a group printer driver, which will be explained hereinlater.

The number of member printers is a portion to store the number of member printers with which the group printer driver is associated.

The member printer driver name is a portion to store the printer driver name of the member printer.

The member printer driver set information portion is a portion to store, for example, the DEVMODE information as set information of the driver UI of the member printer.

Each of the member printer driver name and the member printer driver set information portion has storing areas of the number as many as the member printers stored in the number of member printers mentioned above.

The present file can be a file in which the print instructing portion 8-*a* and the document data portion 8-*b* can be processed in a separable format. In this case, the print instructing portion exists as a print instruction manual file and the document data portion exists as a document data file, respectively. They can be also combined in one archive format and similarly handled like one file.

Figure 9:
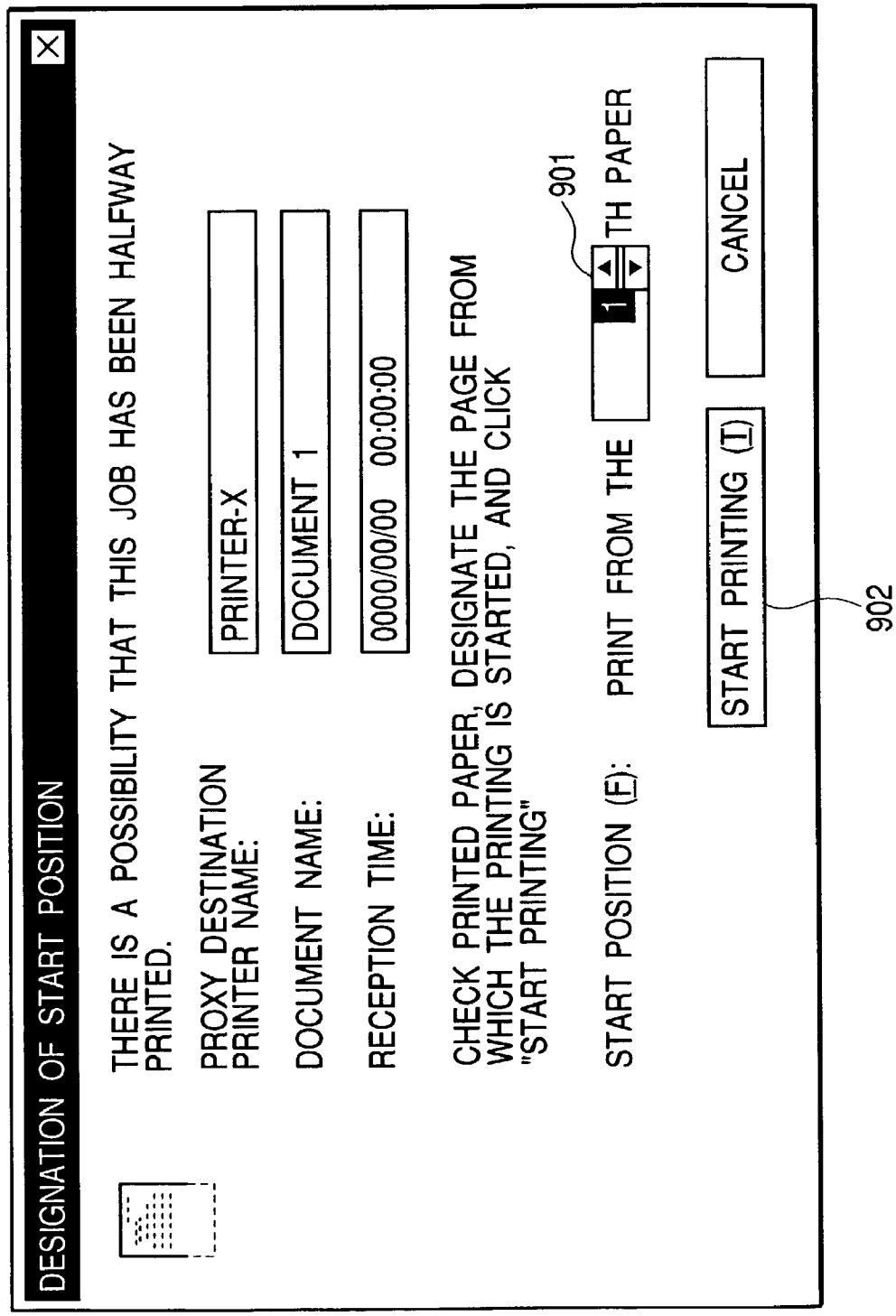
FIG. 9 is a diagram showing an example of a UI showing an example of page designation of a partial printing function of the present system.
Figure 11:
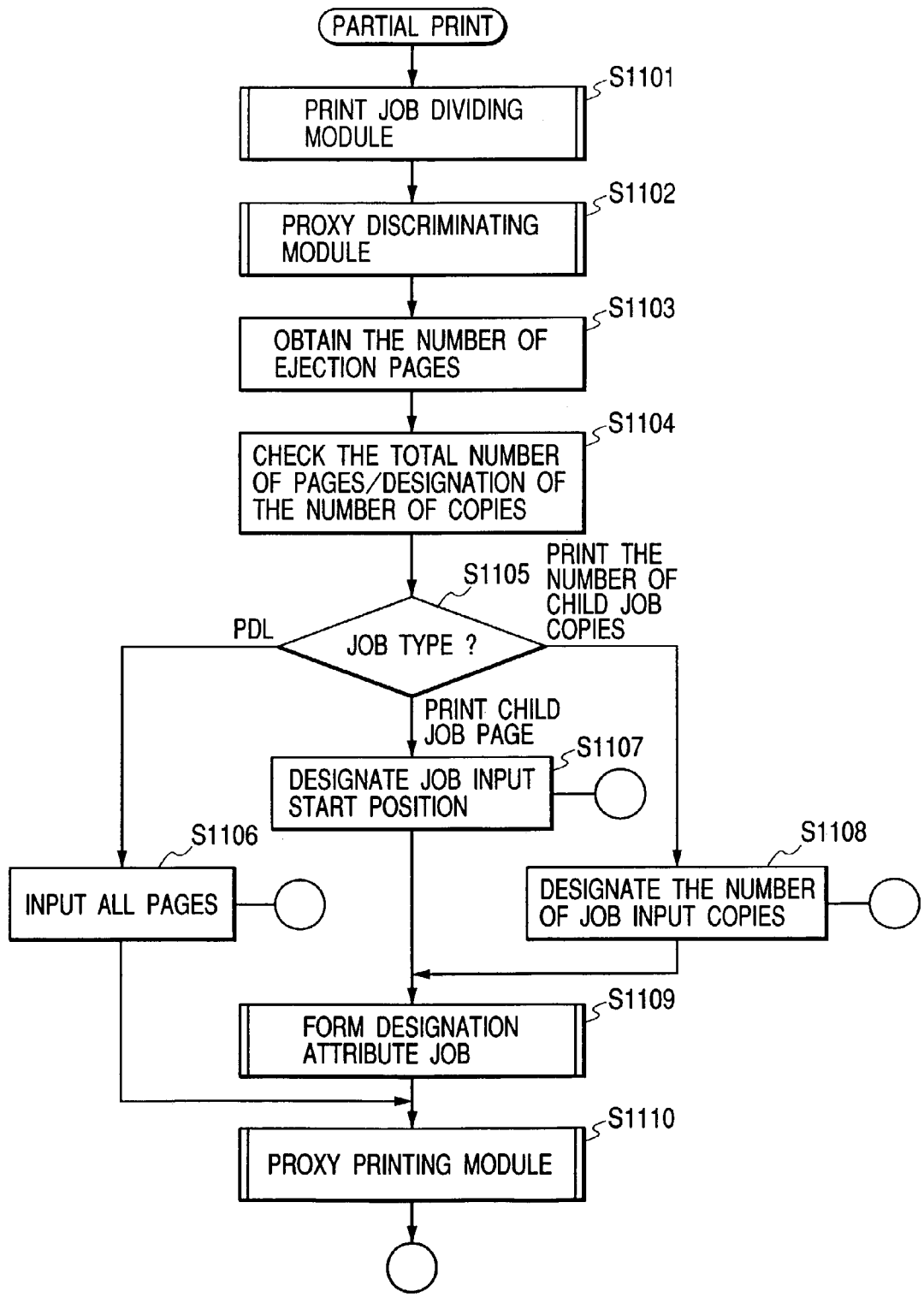
FIG. 11 is a flowchart showing an algorithm for the whole distributed and proxy printing.

FIG. 9 is a diagram showing an example of a using method for explaining an apparatus constructing the distributed and proxy print system of the embodiment. The embodiment will be described hereinbelow with reference to a flowchart. It is assumed that processes in steps shown in a flowchart of FIG. 11 are realized by a method whereby a central processing unit provided for the apparatus serving as a main unit of the processes executes a module (program) for print control stored in a ROM, auxiliary memory means, or the like.

If the print instruction is made under an environment such that the print destination has been set to the distributed and proxy print system via the system as shown in FIGS. 1 to 8 on the host computer side, the distributed and proxy print system executes a dividing process of the job by the PDL driver (602) in accordance with an instruction of the job control print service (622) and executes distributed printing at a preset distribution ratio (S1101).

In the distribution print destination, a process for checking whether the system is in a status where the printing can be normally executed or not is executed (S1102) and transfer is made as necessary. However, in the transfer, the job control print service holds distribution destination information by using an intermediate file identifier as a key in order to trace and manage the print job. Distributed print job identifiers of a page description language (PDL) are also included in the distribution destination information and held on the memory.

Although the events from the actual input and output apparatuses are registered into the print job identifiers of the page description language (PDL) and likewise notified on a unit basis of the print job identifier of the PDL, in the system, since the print job identifiers of the PDL and the identifier on the intermediate file side can be referred to, it is possible to discriminate such a notification is a print notification caused as a result of the original print instruction by which type of the user, and the number of pages outputted to the printer included in the notification information can be also obtained (S1103).

The total number of pages held in the job and the designation information of the number of copies are also obtained and checked (S1104).

Subsequently, the type of job is discriminated (S1105). In the case of the print job which holds only the ordinary PDL, the job is not developed again but the job is inputted again while designating all pages (S1106). The designated proxy printing is executed (S1110). In the print job which holds an intermediate file (for example, a file in the PDF data format of Adobe Systems Inc. or a file in the EMF format of Microsoft Corporation), the job is developed again (S1109) into the PDL according to the printer on the re-input destination side on the basis of the number of pages (S1107) designated by the user in FIG. 9. The re-developed job is inputted to the changed output destination (S1110). Also in the designation of the number of copies, re-development is performed (S1109) by the number of copies (S1108) designated by the user in FIG. 10. The re-developed job is inputted to the changed output destination (S1110).

The user can confirm the operating statuses and print result via the print manager (623) as an apparatus status display unit.

Figure 17B:
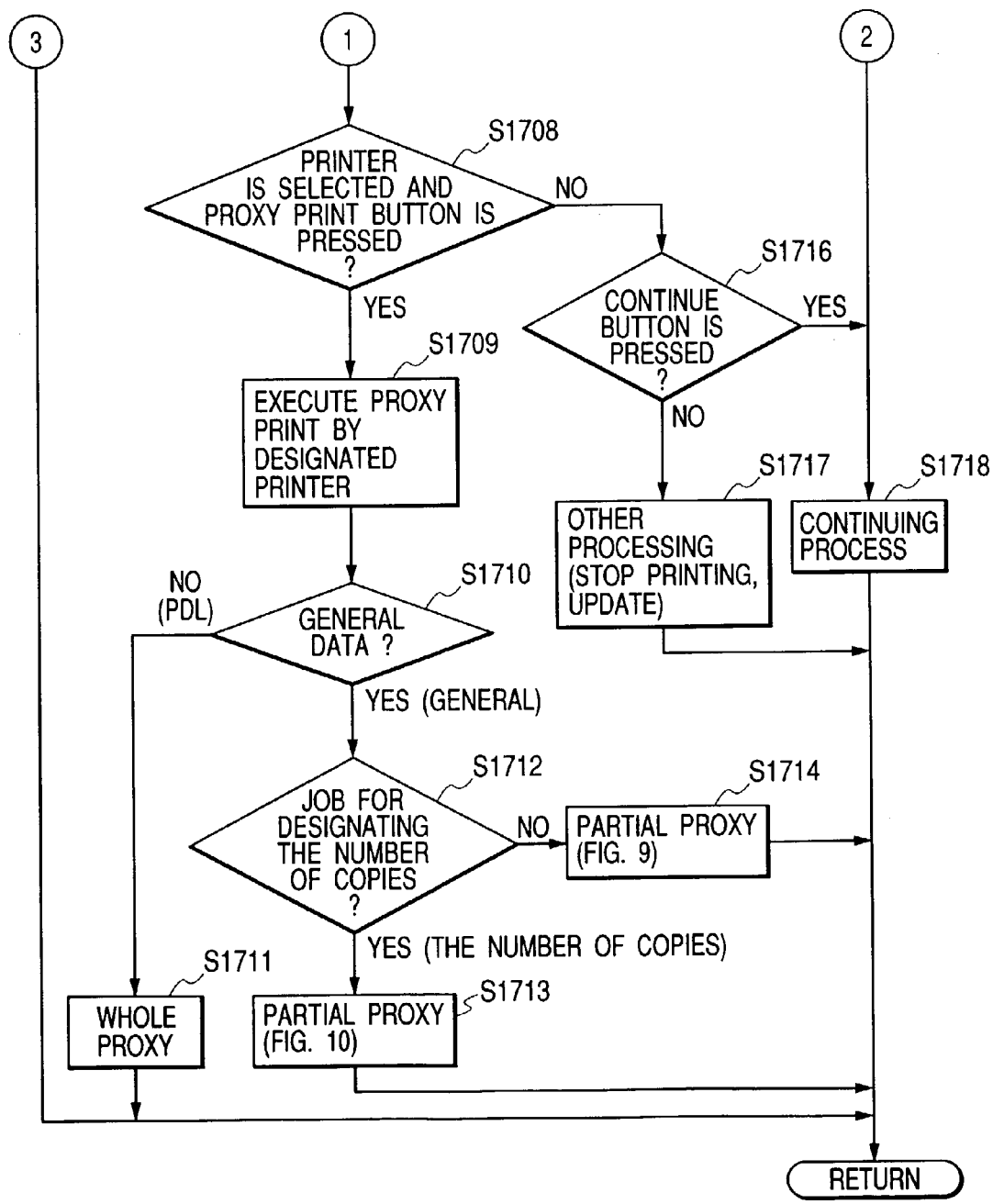
FIG. 17 is comprised of FIGS. 17A and 17B showing flowcharts illustrating an algorithm for manual proxy printing.

Subsequently, a flow of the proxy printing process will be described with reference to flowcharts. It is assumed that processes in steps shown in flowcharts of FIGS. 16, 17A and 17B are realized by a method whereby the central processing unit provided for the apparatus serving as a main unit of the processes executes the module (program) for print control stored in the ROM, auxiliary memory means, or the like.

In step S1601, whether the print job has been received or not is discriminated. If it is determined that the print job is not received, step S1605 follows and other processing is executed.

If it is determined in step S1601 that the print job has been received, S1602 follows. A process of the print job is executed. Whether the occurrence of the error indicative of the unprintable status in the device which is intended to execute the printing has been detected or not is discriminated. If the occurrence of the error is detected, S1606 follows. If the occurrence of the error is not detected, S1603 follows. In S1603, whether the transmission has been disabled during the transmission of the job data to the device by some causes (for example, turn-off of the power source of the device) and an error of the communication with the device has been detected or not is discriminated. If the communication error is detected in S1603, S1606 follows. If the communication error is not detected, S1604 follows. In S1604, whether the occurrence of the error indicative of the unprintable status in the device has been detected during the transmission of the job data to the device or not is discriminated. If the occurrence of the error indicative of the unprintable status in the device is detected in S1604, S1606 follows.

Although the processes in S1602 to S1604 are the foregoing processes (when the error occurs), the process (when a warning is generated in the device), the process (when a print load on the device is high), and the process (at the time of pause of the output port) mentioned above can be simultaneously executed or replaced.

Subsequently, in S1606, whether the automatic proxy has been set by the user or not is discriminated. If the automatic proxy has been set, S1607 follows. The automatic proxy printing process for changing the print destination to another printer in accordance with the priority which has previously been designated by the user is executed without waiting for a distinct instruction of the user. S1608 follows and whether the detected error is an error of the designated specific type or not is discriminated. If it is determined that the error is the error of the specific type, S1610 follows. If it is determined that the error is not the error of the specific type, S1609 follows.

The error of the specific type corresponds to one of the cases of no paper, paper jam, door/cover open, and full of paper ejection tray. The user independently sets whether the automatic proxy is suppressed or not with respect to each error.

in S1609, whether the automatic proxy has successfully been executed or not is discriminated. If it is determined that the automatic proxy failed, the processing routine advances to S1610. Subsequently, a manual proxy process in S1610 will be explained with reference to FIG. 17.

Figure 12:
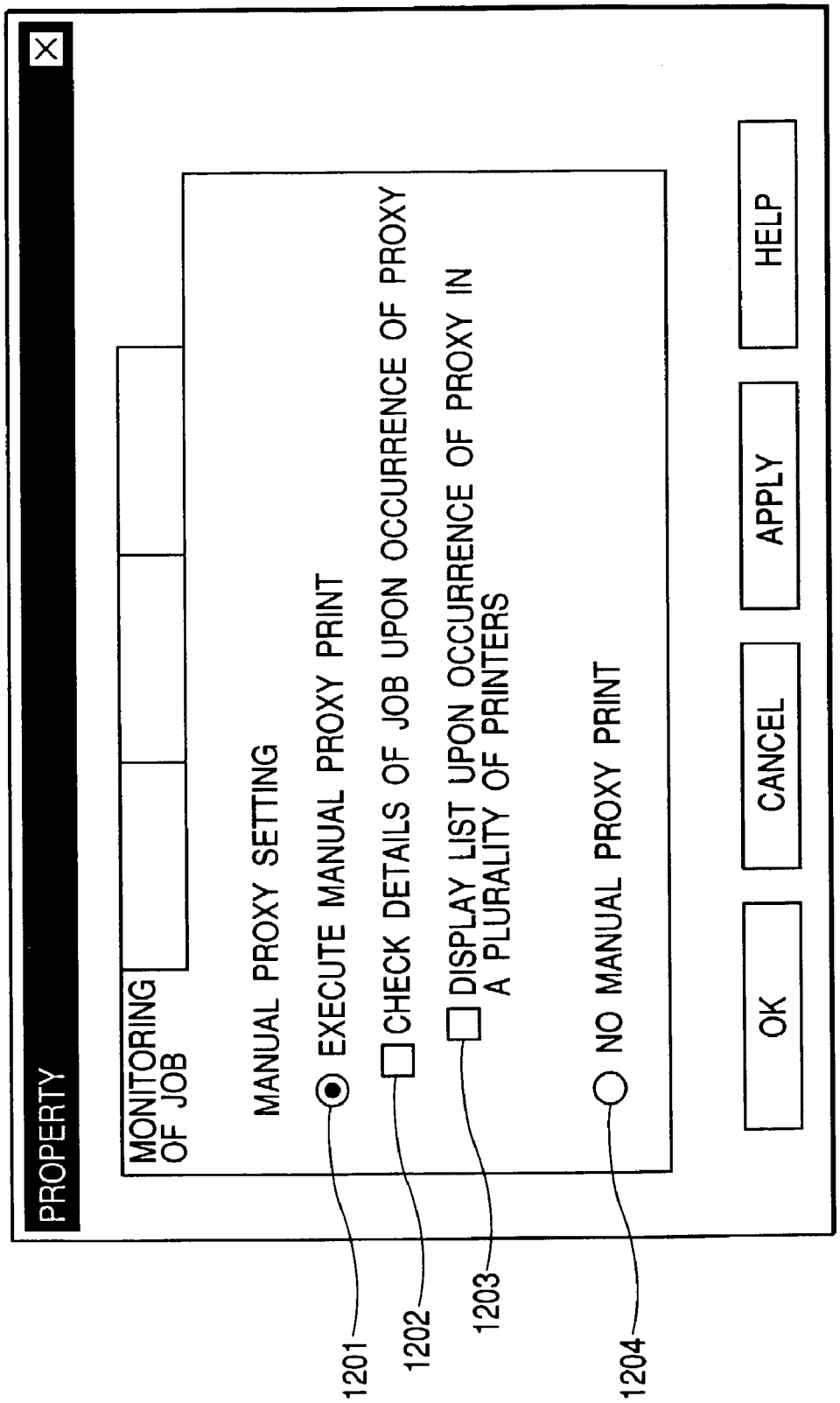
FIG. 12 is a diagram showing an example of a property display screen.
Figure 13:
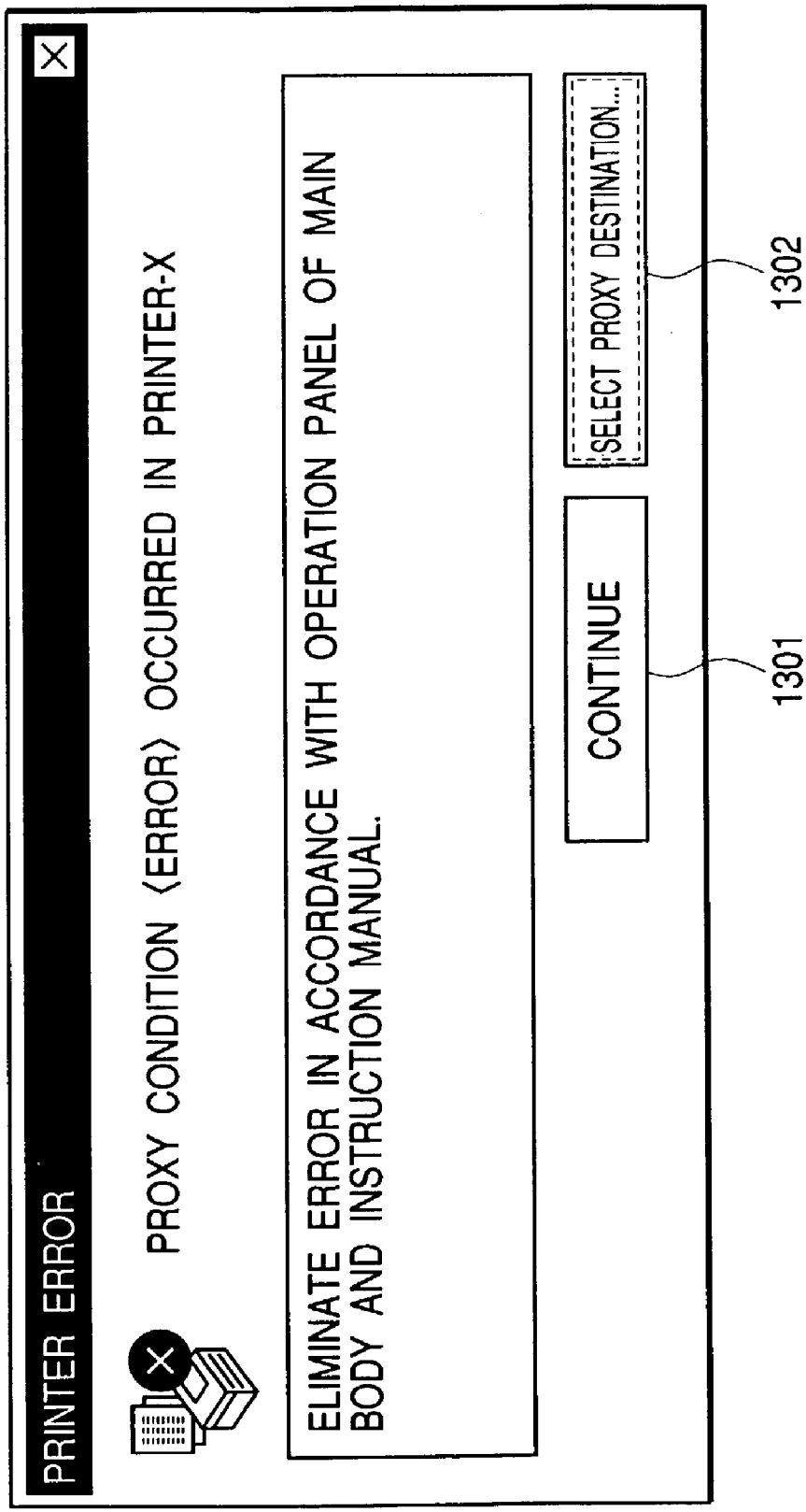
FIG. 13 is a diagram showing an example of a proxy event small dialog.
Figure 14:
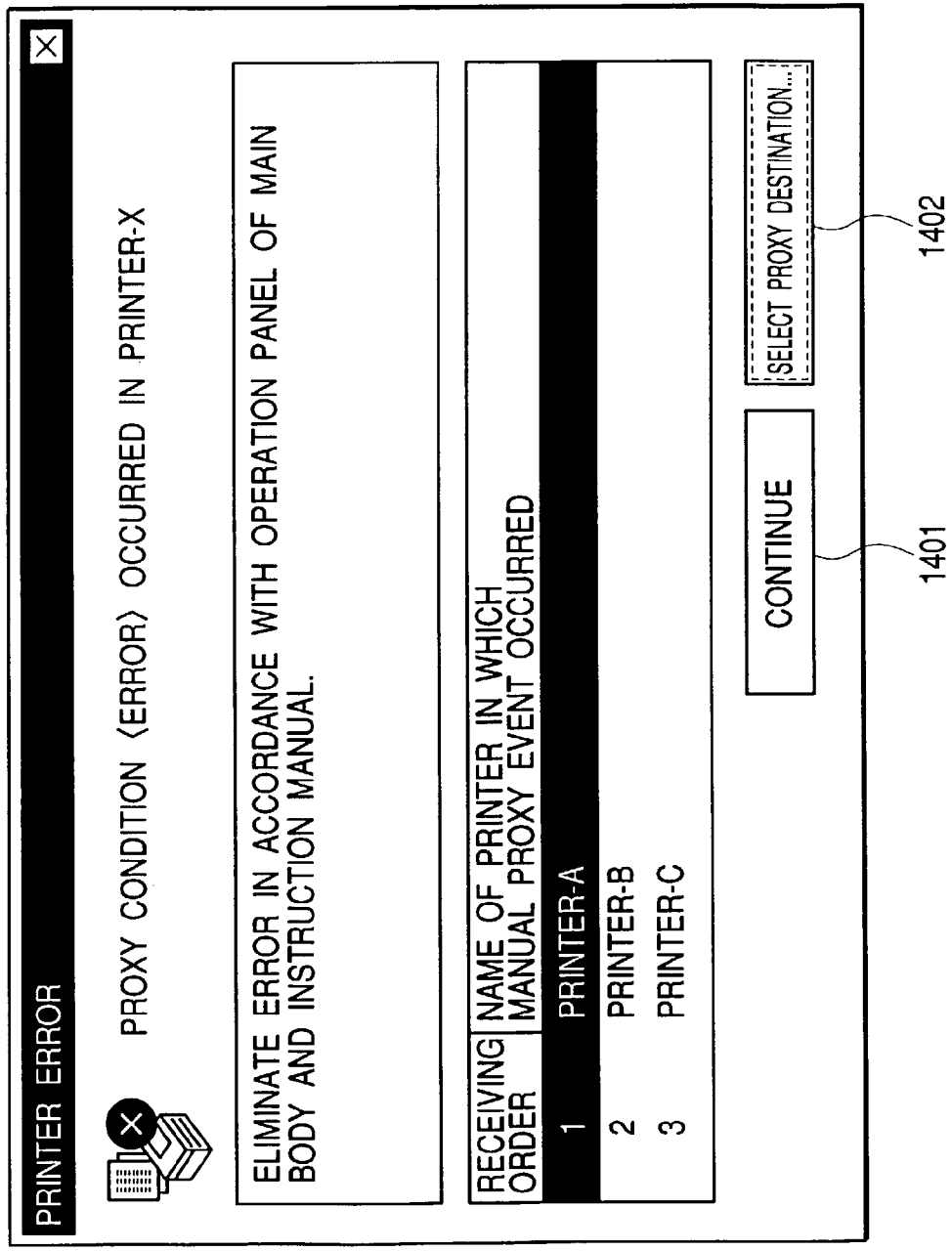
FIG. 14 is a diagram showing an example of the proxy event small dialog.

First, in S1701, whether the manual proxy printing has been set by a check box 1201 in FIG. 12 or not is discriminated. If it is determined that the manual proxy printing is not set, the processing routine is finished. If it is determined that the manual proxy printing has been set, S1702 follows. In S1702, whether a mode to check details of the job upon proxy printing has been set by a check box 1202 in FIG. 12 or not is discriminated. If it is determined that the mode to check details of the job upon proxy printing is not set, S1707 follows. If it is determined that the mode to check details of the job upon proxy printing has been set, S1703 follows. In S1703, whether a mode to display a list when the proxy occurs in a plurality of printers has been set by a check box 1203 in FIG. 12 or not is discriminated. If it is determined that the mode to display a list when the proxy occurs in a plurality of printers has been set, S1704 follows. A proxy event small dialog display screen in FIG. 14 is displayed. If it is determined that the mode to display a list when the proxy occurs in a plurality of printers is not set, S1705 follows. A proxy event small dialog display screen in FIG. 13 is displayed.

Subsequently, whether a select button 1302 or 1402 of the proxy destination has been pressed on the proxy event small dialog display screen in FIG. 13 or 14 or not is discriminated. If it is determined that the select button 1302 or 1402 of the proxy destination has been pressed, S1707 follows. If it is determined that the select button 1302 or 1402 of the proxy destination is not pressed, S1715 follows. Whether a continue button 1301 or 1401 has been pressed or not is discriminated. If it is determined that the continue button 1301 or 1401 has been pressed, S1718 follows. If it is determined that the continue button 1301 or 1401 is not pressed, the processing routine is returned to S1703.

Figure 15:
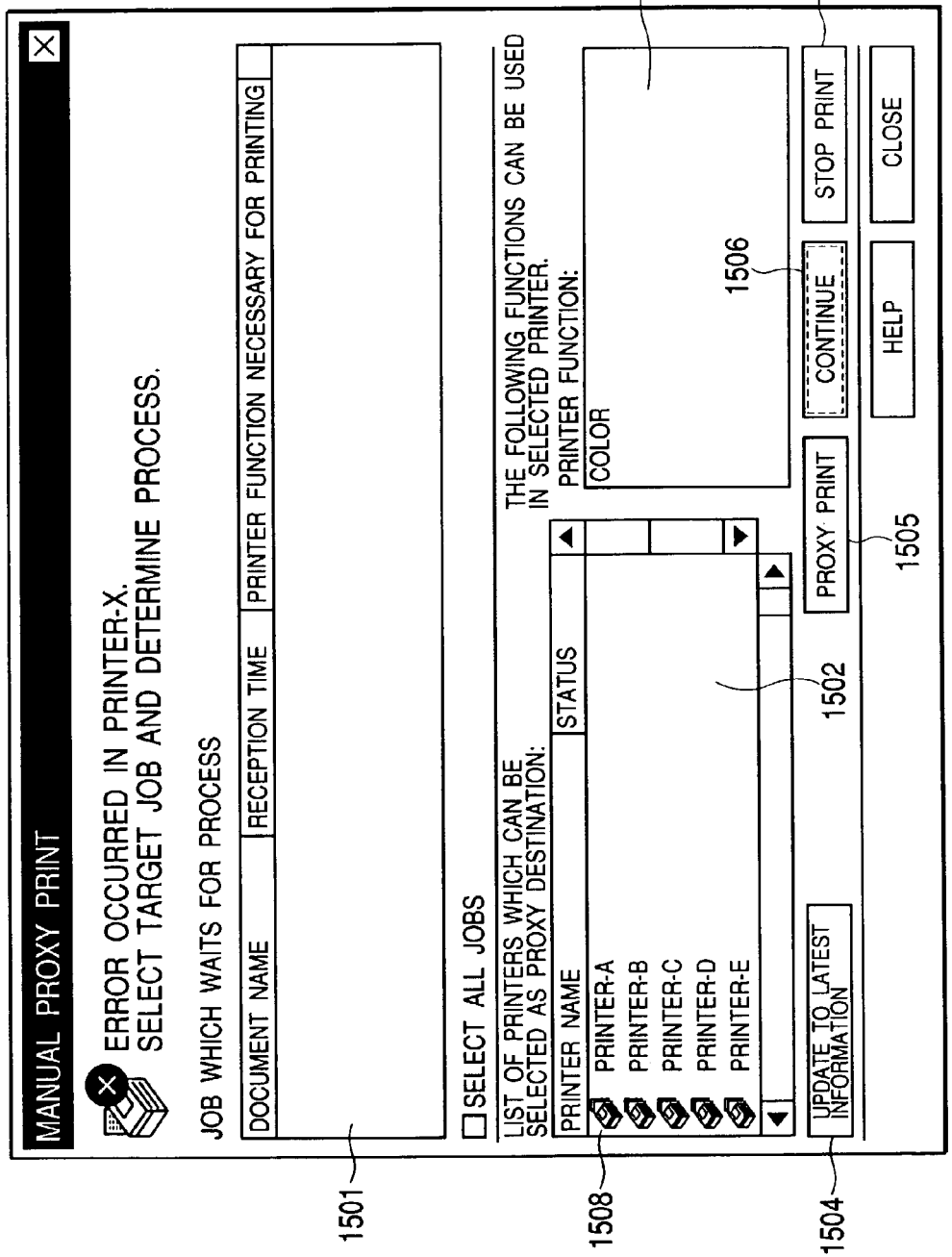
FIG. 15 is a diagram showing an example of a manual proxy UI.

Subsequently, in S1707, a display screen of FIG. 15 is displayed. In S1708, whether a printer of 1508 has been selected by the user and a proxy print button 1505 has been pressed on the display screen of FIG. 15 or not is discriminated. If it is determined that the printer of 1508 has been selected and the proxy print button 1505 has been pressed on the display screen of FIG. 15, S1709 follows. If it is determined that the printer of 1508 has been selected and the proxy print button 1505 is not pressed on the display screen of FIG. 15, S1716 follows. When the user selects the printer, the status of each printer (an error status, a warning status, status in which many jobs have been inputted, a busy status, a port pause status, etc.) is displayed in a column of 1502 in FIG. 15. A list of jobs of the printer selected in 1502 is displayed in a column of 1501. A list of functions (a color function, a duplex printing function, a stapling function, a paper size, etc.) of the printer selected in 1502 is displayed in a column 1503. Therefore, the user can select the proper printer as a proxy destination.

In S1716, whether a continue button 1506 has been pressed or not is discriminated. If it is determined that the continue button 1506 has been pressed, S1718 follows. A continuing process for continuing the process in the printer in which the error occurred is executed without performing the proxy printing. If it is determined that the continue button 1506 is not pressed, S1717 follows. Other processing (if an update button 1504 is pressed, a process for updating the information of the printer displayed in the column 1502 to the latest information is executed; if a print stop button 1507 is pressed, a process for stopping the printing is executed).

Figure 10:
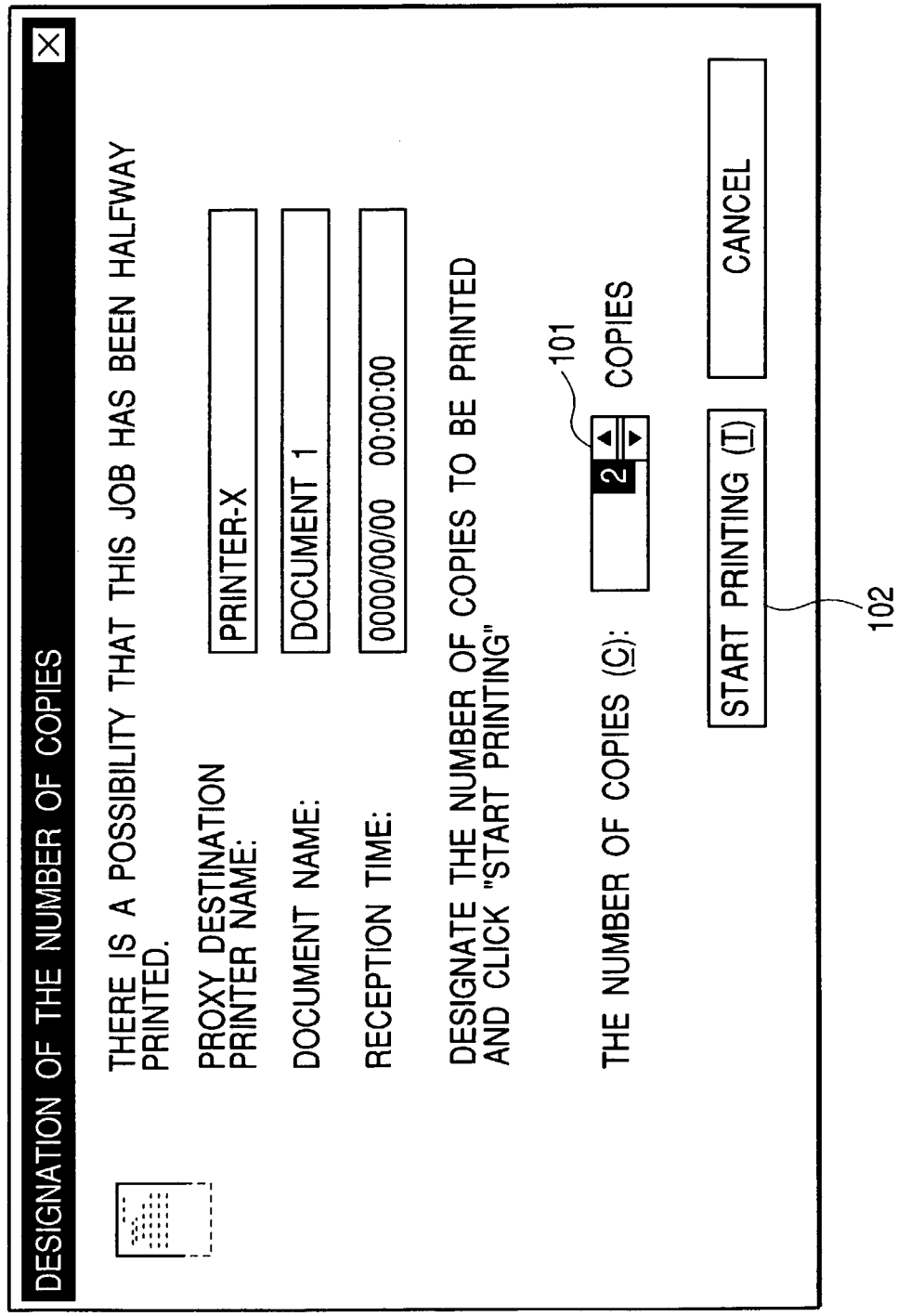
FIG. 10 is a diagram showing an example of a UI showing an example of designation of the number of copies of the partial printing function of the present system.

In S1709, the proxy printing process is executed by the designated printer. In this instance, whether the data of the print job which is proxy-printed is general data (for example, PDF data format or EMF format) or the PDL is discriminated in S1710. If it is determined that the data of the print job which is proxy-printed is not the general data but the PDL that is peculiar to the printer, S1711 follows, thereby allowing the whole proxy printing to be executed instead of the partial printing. If it is determined that the data is the general data (for example, PDF data format or EMF format), S1712 follows. Whether the job to be proxy-printed is a job in which the number of copies has been designated or not is discriminated. If it is determined that the job is the job in which the number of copies has been designated, S1713 follows. A display screen to designate the number of copies in FIG. 10 is displayed, thereby allowing partial proxy printing in which the number of copies is designated to be executed. If it is determined that the job is not the job in which the number of copies has been designated, S1714 follows. A display screen to designate the number of pages in FIG. 9 is displayed, thereby allowing partial proxy printing in which the number of copies is designated to be executed.

As described in detail above, according to the embodiment of the invention, the automatic proxy and the manual proxy can be switched and used.

At the time of the automatic proxy, it can be switched to the manual proxy.

The proxy method can be switched (partially or the whole portion) in accordance with the type of data.

The proxy method can be switched (the number of copies or pages) in accordance with a type of job.

Thus, for example, in the case of the PDL print job in which only the page description language has been developed without using the intermediate file, although it is limited to the case of performing the proxy printing from the head page, the user can correctly perform the printing to the printing apparatus which supports the same page description language. In the case of the print job of a child job which is caused as a result of using the intermediate file, if it is possible to confirm that the data has been halfway printed, the user can designate the subsequent page and designate the proxy printing. The user freely selects an available normal printing apparatus and allows it to perform the proxy printing of the print job which has been re-developed by the page designation into the page description language according to the selected printer. Thus, the proxy printing in which the number of sheets of paper which are printed and the print waiting time are minimized and a correct print result can be outputted can be executed. In the case of the unit of the number of copies, by designating only the number of residual copies and executing the proxy printing without causing the surplus number of copies, the number of sheets of paper which are printed and the print waiting time are likewise minimized. Thus, a print environment in which the print resources and time are effectively used can be provided for the user.

What is claimed is:

1. A proxy print processing apparatus comprising:
   a discrimination unit, adapted to discriminate, upon occurrence of an error in a received print job, whether or not automatic proxy printing has been set; and
   a processing unit, adapted to execute the automatic proxy printing such that the print destination is changed to a preset printer without waiting for a user instruction if it is discriminated by the discrimination unit that the automatic proxy printing has been set and to execute manual proxy printing such that proxy printing is executed after a user instruction for the proxy printing with a user selected printer is given if it is discriminated by the discrimination unit that the automatic proxy printing has not been set,
   wherein the processing unit executes the manual proxy printing if the error in the received print job is a specific error, even when it is discriminated by the discrimination unit that the automatic proxy printing has been set.

2. A proxy print processing apparatus according to claim 1, wherein the processing unit includes a determination unit, adapted to determine whether or not the error in the received print job is the specific error and wherein the specific error comprises at least one of no paper, paper jam, door open, cover open and full paper ejection tray errors.

3. A proxy print processing method comprising:
   a discrimination step of discriminating, upon occurrence of an error in a received print job, whether or not automatic proxy printing has been set; and
   a processing step of executing the automatic proxy printing such that the print destination is changed to a preset printer without waiting for a user instruction if it is discriminated in the discrimination step that the automatic proxy printing has been set and of executing manual proxy printing such that proxy printing is executed after a user instruction for the proxy printing with a user selected printer is given if it is discriminated in the discrimination step that the automatic proxy printing has not been set,
   wherein the processing step executes the manual proxy printing if the error in the received print job is a specific error, even when it is discriminated by the discrimination step that the automatic proxy printing has been set.

4. A proxy print processing method according to claim 3, wherein the processing step includes a determination step of determining whether or not the error in the received print job is the specific error and wherein the specific error comprises at least one of no paper, paper jam, door open, cover open and full paper ejection tray errors.

5. A computer-readable program for executing the proxy print processing method set forth in claim 3.

6. A computer-readable program for executing the proxy print processing method set forth in claim 4.

7. A memory medium that stores a computer-readable program for executing the proxy print processing method set forth in claim 3.

8. A memory medium that stores a computer readable program for executing the proxy print processing method set forth in claim 4.

* * * * *